Oct. 23, 1928.
C. P. TOMPKINS
1,689,063
EXTRA TIRE SUPPORT
Filed Oct. 14, 1927
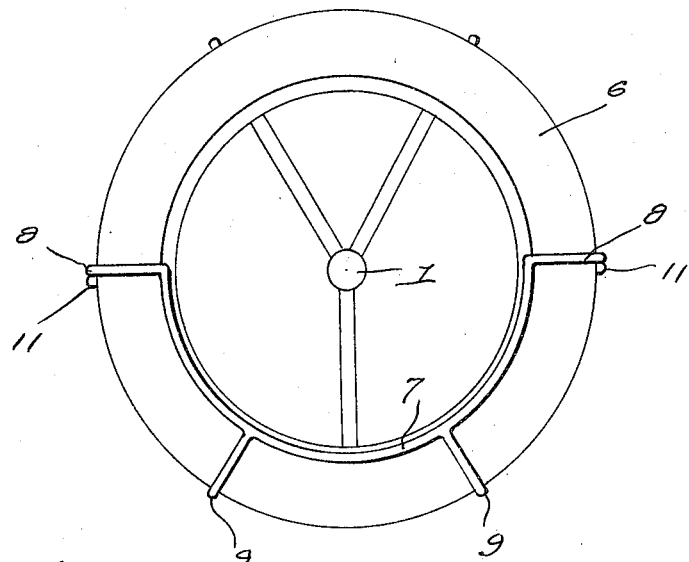
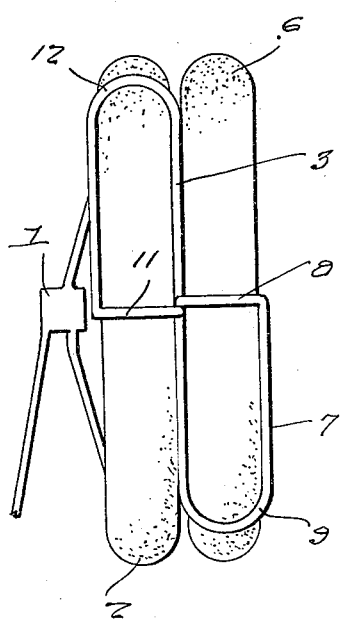
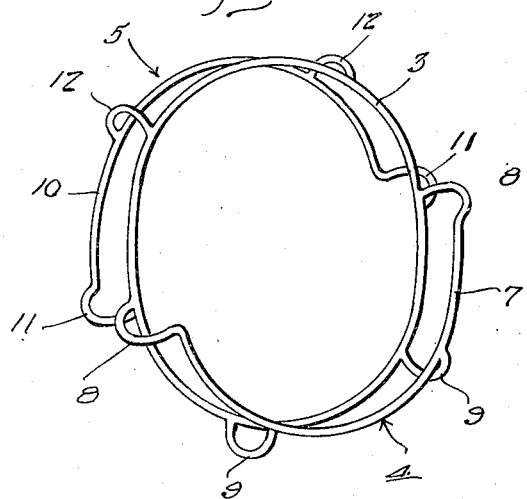
Inventor
Charles P. Tompkins
By *Clarence A. O'Brien*
Attorney Patented Oct. 23, 1928.

1,689,063

UNITED STATES PATENT OFFICE.

CHARLES P. TOMPKINS, OF BARNETT, MISSOURI.

EXTRA-TIRE SUPPORT.

Application filed October 14, 1927. Serial No. 226,099.

My invention relates to an extra tire support wherein the same is adapted for association with an ordinary spare tire supported in position on a conventional tire carrier.

I have found that the majority of cars at present are provided with spare tire carriers, but a great number of these carriers are only capable of supporting a single tire.

Now it is the experience of many motorists when they are desirous of taking a distant trip, that they must take more than the one customary spare tire. The only alternative where there is only a single spare tire carrier, it to tie or secure in some manner an extra tire on the spare tire carrier.

This requires considerable time and labor, and is never as satisfactory as when the tire is supported securely in position on a carrier especially constructed for that particular purpose.

Another object therefore, of my invention is to provide such a support for carrying an extra tire, the same being hooked over the spare tire supported on the spare tire carrier.

Another object resides in the particular construction whereby the same may be quickly and conveniently mounted for use.

Other very novel objects and advantages will become apparent as my invention is better understood from the specification and claim to follow.

In the drawing:—

Figure 1 is a rear elevation of my improved tire support, showing the same supporting an extra tire in position.

Fig. 2 is a side elevation of my improved tire support, showing the same in mounting position in respect to the spare tire, and showing an extra tire in association therewith, and Fig. 3 is a perspective view of the support.

For a more detailed explanation of my invention, I now refer to the drawings in which like numerals designate like parts.

In Fig. 2 of the drawing, my improved support is shown in association with the conventional tire carrier 1 with an extra tire supported thereon. The spare tire 2 is mounted upon the carrier in the ordinary manner, and it is with this spare tire that my invention is associated.

Generally, my support consists of an annular member 3, of substantially heavy metal. This annular member or ring is provided at its lower portion on one side with a saddle construction, referred generally to at 4. At the opposed side of the ring, and at the top portion thereof, is a second saddle construction generally referred to as 5. In use, the saddle 5 is adapted to be disposed over the spare tire 2, and is clearly shown in Fig. 2 of the drawing, and the extra tire 6 is adapted to be supported in the saddle 4.

The saddle 4 consists of a semi-circular rail 7 secured to the annular ring 3 at its end portion by arcuate-shaped connecting members 8, and connecting to the annular ring at diametrically opposed portions thereof. The semi-circular rail 7 is further connected to the ring 3 with similar-shaped connecting members 9, and upon which the extra tire is adapted to be supported.

The upper saddle consists of the semi-circular rail 10, connected to the annular ring at its end portions by arcuate-shaped connecting members 11. The connections 11 are connected to the annular ring at a point thereon adjacent to the respective connectors 8 of the lower saddle. Arcuate shaped connectors 12 connect the upper saddle rail 10 at its upper portion and to the upper portion of the annular ring.

In mounting my improved extra tire support in position, the upper saddle 5 constructed at the upper front side of the annular ring 3, is disposed over the spare tire 2, supported on the conventional tire carrier 1, and is clearly disclosed in Fig. 2 of the drawing. In this position, the support is ready to receive and support the extra tire 6. When the extra tire is positioned in the lower saddle 4, constructed on the opposite side of the annular ring from the upper saddle, the same will be supported upon the arcuate-shaped connectors 9.

It will thusly be seen that I have provided an extra tire carrier of the character set out in the specification which will be simple in construction, and of convenient proportions, for assembly.

Having thus described my invention, what I claim as new is:—

An extra tire carrier for association with the usual spare tire supported on a conventional tire carrier, including an annular frame, a lower saddle construction at one side of the frame, said lower saddle construction consisting of a semi-circular side rail, said side rail being connected to the frame by arcuate shaped connectors, an upper saddle at the opposite side of the frame, said upper saddle construction consisting of a semi-circular side rail, said side rail being connected to the frame by arcuate shaped connectors, the ends of said side rails being bent inwardly and connected to the annular frame wall on substantially a horizontal plane.

In testimony whereof I affix my signature.

CHARLES P. TOMPKINS.